United States Patent
Ikeda et al.

(10) Patent No.: US 7,915,358 B2
(45) Date of Patent: Mar. 29, 2011

(54) COPOLYMER, PRODUCTION PROCESS THEREOF, LUBRICATING OIL VISCOSITY MODIFIER, AND LUBRICATING OIL COMPOSITION

(75) Inventors: Satoshi Ikeda, Chiba (JP); Akihiro Matsuda, Ichihara (JP); Yoshiki Shimokawatoko, Chiba (JP); Junichi Mohri, Sanbu-gun (JP); Toshiyuki Shimazaki, Chiba (JP); Hiroshi Terao, Ichihara (JP); Koji Takeda, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 12/379,143

(22) Filed: Feb. 13, 2009

(65) Prior Publication Data

US 2009/0209721 A1 Aug. 20, 2009

Related U.S. Application Data

(60) Provisional application No. 61/064,081, filed on Feb. 14, 2008.

(30) Foreign Application Priority Data

Feb. 14, 2008 (JP) ................................. 2008-033363

(51) Int. Cl.
*C08F 4/646* (2006.01)
(52) U.S. Cl. ...................... 526/113; 526/160; 526/124.3; 526/348; 526/348.2; 526/348.3; 526/348.6
(58) Field of Classification Search .................. 526/348, 526/348.2, 348.3, 348.6, 112, 160, 124.3
See application file for complete search history.

(56) References Cited

U.S. PATENT DOCUMENTS

| | | | |
|---|---|---|---|
| 3,697,429 A | 10/1972 | Engel et al. | |
| 5,177,147 A | 1/1993 | Spenadel et al. | |
| 6,054,544 A | 4/2000 | Finlayson et al. | |
| 7,022,766 B2 | 4/2006 | Okada et al. | |
| 7,053,153 B2 * | 5/2006 | Schauder | 525/191 |
| 2006/0025640 A1 | 2/2006 | Karjala et al. | |
| 2006/0116303 A1 | 6/2006 | Iimura et al. | |
| 2006/0199896 A1 | 9/2006 | Walton et al. | |
| 2008/0125561 A1 * | 5/2008 | Matsuda et al. | 526/348 |

FOREIGN PATENT DOCUMENTS

| | | |
|---|---|---|
| JP | 60-35009 | 2/1985 |
| JP | 2000-503333 A | 3/2000 |
| JP | 2003-48931 | 2/2003 |
| JP | 2005-120308 | 5/2005 |
| JP | 2006-502259 A | 1/2006 |
| JP | 2006-176760 A | 7/2006 |
| WO | WO 02/46251 A2 | 6/2002 |
| WO | WO 2008/047878 A1 | 4/2008 |

* cited by examiner

Primary Examiner — Ling-Siu Choi
(74) Attorney, Agent, or Firm — Foley & Lardner LLP

(57) ABSTRACT

Copolymers when used as lubricating oil viscosity modifiers enable lubricating oils to show excellent low-temperature properties. Processes for producing the copolymers are disclosed. Lubricating oil viscosity modifiers and lubricating oil compositions contain the copolymers.

A copolymer includes structural units derived from ethylene and structural units derived from a C3-20 α-olefin and satisfies the following requirements (1) to (8): (1) the melting point (Tm) according to DSC is in the range of 0 to 60° C.; (2) the melting point (Tm) and the density D (g/cm$^3$) satisfy the equation: Tm≧1073×D−893; (3) Mw/Mn according to GPC is from 1.6 to 5.0; (4) the half-value width ($\Delta T_{half}$) of a melting peak measured by DSC is not more than 90° C.; (5) the half-value width ($\Delta T_{half}$) and the melting point (Tm) satisfy the equation: $\Delta T_{half}$≦−0.71×Tm+101.4; (6) the heat of fusion (ΔH) as measured by DSC is not more than 60 J/g; (7) the crystallization temperature (Tc) measured by DSC is not more than 70° C.; (8) the heat of fusion (ΔH), the crystallization temperature (Tc), each measured by DSC and the crystallization temperature measured by a CRYSTAF method ($T_{crystaf}$) satisfy the equation: Tc−$T_{crystaf}$≧0.028×ΔH+25.3.

4 Claims, No Drawings

COPOLYMER, PRODUCTION PROCESS THEREOF, LUBRICATING OIL VISCOSITY MODIFIER, AND LUBRICATING OIL COMPOSITION

FIELD OF THE INVENTION

The present invention relates to novel copolymers, processes for the production of the copolymers, and uses of the copolymers. In more detail, the invention relates to copolymers which contain structural units derived from ethylene and structural units derived from an α-olefin and have specific properties. The invention also relates to processes for producing the copolymers, lubricating oil viscosity modifiers comprising the copolymers, and lubricating oil compositions containing the lubricating oil viscosity modifiers.

BACKGROUND OF THE INVENTION

Petroleum products generally increase viscosity with decreasing temperature and vice versa, in other words, their viscosity is dependent on temperature. Automotive lubricating oils for example are required to have a less temperature dependent viscosity. In order to reduce the temperature dependence of viscosity, lubricating oils are mixed with viscosity modifiers that are specific polymers soluble in lubricating oil bases. Ethylene/(α-olefin copolymers are widely used as such viscosity modifiers, and the viscosity modifiers undergo various improvements to provide a further enhanced balance of lubricating oil performances.

The viscosity modifiers are usually used to prevent the lowering in lubricating oil viscosity at high temperatures. In recent years, however, there is a need for viscosity modifiers capable of suppressing the increase in lubricating oil viscosity at low temperatures (thereby providing excellent low-temperature properties). Further, excellent shear stability is required because lubricating oil compositions are generally used in applications where a shear force is applied. To improve the shear stability, low molecular weight polymers are usually used. However, viscosity modifiers having a low molecular weight have to be added in an increased amount so that the lubricating oils will have a desired viscosity, thereby causing economic disadvantages. Increasing the molecular weight of the viscosity modifiers and thereby reducing the amount of the modifiers will improve the economic efficiency of lubricating oils, but also deteriorate the shear stability.

In connection with the art in the above technical field, Patent Document 1 discloses a blend of ethylene/α-olefin copolymers differing in ethylene content.

This polymer blend is described to provide excellent low-temperature properties. However, the balance of performances other than low-temperature properties is insufficient.

Patent Document 2 describes ethylene/(α-olefin copolymers which have a nonuniform intramolecular composition, a narrow intermolecular composition distribution and a narrow molecular weight distribution.

In the production process disclosed in this patent document, the reaction is catalyzed by a single catalyst system in a tubular reactor in which the monomer concentrations are varied whereby the intramolecular composition is made nonuniform. The copolymer obtained therein is a so-called tapered copolymer in which the intramolecular composition in the polymer chain gradually changes and the intramolecular composition distribution is broad.

However, the above copolymer provides insufficient low-temperature properties. This is probably because the copolymer has an undesired segment because of the broad intramolecular composition distribution.

To solve this problem, Patent Document 3 discloses copolymers having a highly controlled intramolecular composition distribution.

As described in Production Examples in this patent document, the copolymers are produced by successive polymerization to highly control properties such as intramolecular composition distribution.

However, the successive polymerization is not industrially productive because materials having varied monomer proportions have to be supplied successively. Accordingly, simple production processes are desired.

Furthermore, Patent Document 4 discloses copolymers that are highly controlled in intramolecular composition distribution.

This patent document teaches relatively simple processes for producing the copolymers while highly controlling the intramolecular composition distribution.

However, the use of the copolymers as lubricating oil viscosity modifiers results in a very bad balance of lubricating oil performances.

Patent Document 1: U.S. Pat. No. 3,697,429
Patent Document 2: JP-A-S60-035009
Patent Document 3: JP-A-2003-48931
Patent Document 4: US 2006/0199896

DISCLOSURE OF THE INVENTION

It is an object of the present invention to provide copolymers that are used as lubricating oil viscosity modifiers whereby lubricating oil compositions show excellent low-temperature properties.

It is another object of the invention to provide processes for producing the copolymers with excellent industrial productivity.

It is a still another object of the invention to provide lubricating oil viscosity modifiers comprising the copolymers, and lubricating oil compositions containing the lubricating oil viscosity modifiers.

A copolymer according to the present invention comprises structural units derived from ethylene and structural units derived from a C3-20 α-olefin and satisfies the following requirements (1) to (8):

(1) the melting point (Tm) according to DSC is in the range of 0 to 60° C.;

(2) the melting point (Tm) and the density D (g/cm$^3$) satisfy the equation {1} below:

$$Tm \geq 1073 \times D - 893 \quad \{1\}$$

(3) Mw/Mn according to GPC is in the range of 1.6 to 5.0;

(4) the half-value width ($\Delta T_{half}$) of a melting peak measured by DSC is not more than 90° C.;

(5) the half-value width ($\Delta T_{half}$) and the melting point (Tm) satisfy the equation {2} below:

$$\Delta T_{half} \leq -0.71 \times Tm + 101.4 \quad \{2\}$$

(6) the heat of fusion ($\Delta H$) as measured by DSC is not more than 60 J/g;

(7) the crystallization temperature (Tc) according to DSC is not more than 70° C.;

(8) the heat of fusion ($\Delta H$), the crystallization temperature (Tc) measured by DSC and the crystallization temperature measured by a CRYSTAF method ($T_{crystaf}$) satisfy the equation {3} below:

$$Tc - Tcrystaf \geq 0.028 \times \Delta H + 25.3 \quad \{3\}$$

The copolymers according to the present invention include:

copolymers containing structural units derived from ethylene and structural units derived from a C3-20 α-olefin wherein the copolymers are obtained by polymerizing ethylene and a C3-20 α-olefin in the presence of two or more polymerization catalysts and a chain transfer catalyst wherein the polymerization catalysts provide polymers with different properties under substantially identical polymerization conditions, and wherein the copolymers have a melting point (Tm) measured by DSC of 0 to 60° C.;

copolymers containing structural units derived from ethylene and structural units derived from a C3-20 α-olefin wherein the copolymers are obtained by polymerizing ethylene and a C3-20 α-olefin in the presence of two or more polymerization catalysts and a chain transfer catalyst wherein the polymerization catalysts provide polymers with different properties under substantially identical polymerization conditions, and wherein the copolymers have a melting point (Tm) of 0 to 60° C. and a crystallization temperature (Tc) of not more than 70° C., each measured by DSC; and copolymers containing structural units derived from ethylene and structural units derived from a C3-20 α-olefin wherein the copolymers are obtained by polymerizing ethylene and a C3-20 α-olefin in the presence of two or more polymerization catalysts and a chain transfer catalyst wherein the polymerization catalysts provide polymers with different properties under substantially identical polymerization conditions, and wherein the copolymers have a melting point (Tm) of 0 to 60° C. and a crystallization temperature (Tc) of not more than 70° C., each measured by DSC, and the melting point (Tm) and the density D (g/cm$^3$) satisfy the equation {1} above.

In the copolymers of the present invention, the α-olefin is preferably propylene. The copolymers preferably have a polystyrene-equivalent weight average molecular weight as measured by GPC of 10,000 to 2,000,000.

Processes according to the present invention produce the copolymers as described above and comprise polymerizing ethylene and a C3-20 α-olefin in the presence of two or more polymerization catalysts and a chain transfer catalyst wherein the polymerization catalysts provide polymers with different properties under substantially identical polymerization conditions.

As used herein, the words substantially identical polymerization conditions mean that conditions are identical except the types of the polymerization catalysts. The words polymers with different properties refer to copolymers having different composition ratio.

A lubricating oil viscosity modifier according to the present invention comprises the copolymer as described above.

A lubricating oil composition according to the present invention contains the lubricating oil viscosity modifier.

ADVANTAGES OF THE INVENTION

The copolymers of the invention when used as lubricating oil viscosity modifiers give lubricating oil compositions showing excellent low-temperature properties.

The processes of the invention produce the copolymers with excellent industrial productivity.

Further, the invention provides the lubricating oil viscosity modifiers comprising the copolymers, and the lubricating oil compositions contain the lubricating oil viscosity modifiers.

PREFERRED EMBODIMENTS OF THE INVENTION

The copolymers, production processes thereof, lubricating oil viscosity modifiers and lubricating oil compositions according to the present invention will be described in detail hereinbelow.

[Copolymers]

The copolymers of the invention contain structural units derived from ethylene and structural units derived from a C3-20 α-olefin.

Examples of the C3-20 α-olefins include C3-20 linear or branched α-olefins such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; and C3-20 cyclic olefins such as cyclopentene, cycloheptene, norbornene, alkylnorbornenes such as 5-methyl-2-norbornene, tetracyclododecene and 2-methyl-1,4,5,8-dimethano-1,2,3, 4,4a,5,8,8a-octahydronaphthalene.

These α-olefins may be used singly, or two or more kinds may be used in combination.

Of the α-olefins, propylene, 1-butene, 1-pentene, 1-hexene, 1-heptene and 1-octene are preferable in view of low-temperature viscosity, and propylene is most preferable.

The copolymers generally have a polystyrene-equivalent weight average molecular weight (Mw) as measured by GPC (gel permeation chromatography) of not less than 10,000, preferably not less than 20,000, more preferably not less than 40,000, and still more preferably not less than 60,000. The upper limit of the weight average molecular weight is not particularly limited, but is generally 2,000,000, preferably 1,000,000, and particularly preferably 500,000.

The copolymers of the invention satisfy the requirements (1) to (8) described below.

<Requirement (1)>

The melting point (Tm) of the copolymer is in the range of 0 to 60° C.

In the present invention, the melting point (Tm) is determined with a differential scanning calorimeter (DSC). The melting point (Tm) of the copolymers is preferably in the range of 5 to 60° C., and particularly preferably 10 to 60° C. The melting point (Tm) in this range ensures that the obtainable lubricating oil composition shows good low-temperature properties (balance between low-temperature viscosity and low-temperature flowability).

<Requirement (2)>

The melting point (Tm) and the density D (g/cm$^3$) of the copolymer satisfy the equation {1} below:

$$Tm \geq 1073 \times D - 893 \quad \{1\}$$

The density D of the copolymers is not particularly limited but is usually in the range of 0.850 to 0.930 g/cm$^3$.

The satisfaction of the equation {1} ensures that the obtainable lubricating oil composition shows good low-temperature properties (balance between low-temperature viscosity and low-temperature flowability).

<Requirement (3)>

The copolymer has a molecular weight distribution (Mw/Mn) according to GPC in the range of 1.6 to 5.0.

In the invention, the molecular weight distribution is measured using monodispersed polystyrenes as standards. The copolymers of the invention preferably have Mw/Mn in the range of 1.6 to 4.5, and more preferably 1.6 to 4.0. This Mw/Mn ensures that the obtainable lubricating oil composition shows good shear stability. The copolymers having Mw/Mn in the above range may be produced by the processes of the present invention as will be described later.

<Requirement (4)>

The half-value width ($\Delta T_{half}$) of a melting peak of the copolymer measured by DSC is not more than 90° C.

In the present invention, the half-value width of a melting peak is measured with a differential scanning calorimeter (DSC).

The copolymers of the invention preferably have $\Delta T_{half}$ of not more than 80° C., and particularly preferably not more than 75° C. This half-value width ($\Delta T_{half}$) ensures that the obtainable lubricating oil composition shows good low-temperature properties (balance between low-temperature viscosity and low-temperature flowability).

<Requirement (5)>

The half-value width ($\Delta T_{half}$) and the melting point (Tm) of the copolymer satisfy the equation {2} below:

$$\Delta T_{half} \leq -0.71 \times Tm + 101.4 \qquad \{2\}$$

The satisfaction of the equation {2} ensures that the obtainable lubricating oil composition shows good low-temperature properties (balance between low-temperature viscosity and low-temperature flowability).

<Requirement (6)>

The heat of fusion ($\Delta H$) of the copolymer as measured by DSC is not more than 60 J/g.

The copolymers preferably have a heat of fusion ($\Delta H$) of not more than 55 J/g, and more preferably not more than 50 J/g. The lower limit of the heat of fusion is not particularly limited but is preferably 1 J/g.

This heat of fusion ($\Delta H$) ensures that the obtainable lubricating oil composition shows improved low-temperature properties (low-temperature flowability).

<Requirement (7)>

The crystallization temperature (Tc) of the copolymer according to DSC is not more than 70° C.

The copolymers preferably have a crystallization temperature (Tc) of not more than 65° C., and more preferably not more than 60° C. The lower limit of the crystallization temperature (Tc) is not particularly limited but is preferably −10° C.

The crystallization temperature (Tc) in this range ensures that the obtainable lubricating oil composition shows good low-temperature properties (balance between low-temperature viscosity and low-temperature flowability).

<Requirement (8)>

The heat of fusion ($\Delta H$), the crystallization temperature (Tc) measured by DSC and the crystallization temperature measured by a CRYSTAF method ($T_{crystaf}$) satisfy the equation {3} below. More preferably, the copolymers of the invention satisfy the equation {3'}, still more preferably the equation {3''}, and particularly preferably the equation {3'''}.

$$Tc - T_{crystaf} \geq 0.028 \times \Delta H + 25.3 \qquad \{3\}$$

$$Tc - T_{crystaf} \geq 0.028 \times \Delta H + 26.3 \qquad \{3'\}$$

$$Tc - T_{crystaf} \geq 0.028 \times \Delta H + 28.3 \qquad \{3''\}$$

$$Tc - T_{crystaf} \geq 0.028 \times \Delta H + 30.3 \qquad \{3'''\}$$

The satisfaction of the above equation ensures that the obtainable lubricating oil composition shows good low-temperature properties (balance between low-temperature viscosity and low-temperature flowability).

In the requirement (1), the melting point (Tm) may be controlled by increasing or decreasing the feeding amount of ethylene monomer. In general, the melting point (Tm) increases with increasing amount of ethylene monomer and decreases with decreasing amount of ethylene monomer.

In the requirement (2), the relation between Tm and density may be controlled by incorporating a crystalline polymer block into the polymer chain.

In the requirement (3), Mw/Mn may be controlled by increasing or lowering the polymerization temperature.

In the requirement (4), $\Delta T_{half}$ may be controlled by increasing or reducing the catalyst concentration at the initiation of the polymerization. In detail, $\Delta T_{half}$ is increased by increasing the catalyst concentration at the initiation of the polymerization. Further, $\Delta T_{half}$ tends to be increased under conditions such that the polymerization proceeds rapidly.

In the requirement (5), the relation between $\Delta T_{half}$ and Tm may be controlled by changing $\Delta T_{half}$ and Tm in the manners as described above.

In the requirement (6), $\Delta H$ may be controlled by increasing or decreasing the feeding amount of ethylene monomer.

In the requirement (7), Tc may be controlled by increasing or decreasing the feeding amount of ethylene monomer. In general, Tc increases with increasing amount of ethylene monomer and decreases with decreasing amount of ethylene monomer.

In the requirement (8), the relation among $\Delta H$, Tc and $T_{crystaf}$ may be controlled by changing the proportions of two or more polymerization catalysts (for example, transition metal compounds (A-1) and (A-2) described later), chain transfer catalyst and monomers.

The copolymers of the invention may have any monomer arrangements without limitation, but are generally block copolymers. According to an embodiment of the present invention, the copolymer has a polymer block (i) which is obtained from ethylene and a C3-20 α-olefin and in which the molar ratio of ethylene-derived structural units and α-olefin-derived structural units (ethylene/α-olefin) is in the range of 20/80 to 65/35 and the weight average molecular weight is from 5,000 to 1,000,000, and a polymer block (ii) which is obtained from ethylene and a C3-20 α-olefin and in which the molar ratio of ethylene-derived structural units and α-olefin-derived structural units (ethylene/α-olefin) is in the range of 70/30 to 85/15 and the weight average molecular weight is from 5,000 to 800,000; and is terminated with the polymer block (i) at both ends of the copolymer.

Desirably, the polymer block (i) is obtained from ethylene and a C3-20 α-olefin and has a molar ratio of ethylene-derived structural units and α-olefin-derived structural units (ethylene/α-olefin) in the range of 20/80 to 65/35, and preferably 40/60 to 64/36 and a weight average molecular weight ranging from 5,000 to 1,000,000, preferably 20,000 to 1,000,000, more preferably 20,000 to 800,000, and still more preferably 20,000 to 500,000.

Desirably, the polymer block (ii) is obtained from ethylene and a C3-20 α-olefin and has a molar ratio of ethylene-derived structural units and α-olefin-derived structural units (ethylene/α-olefin) in the range of 70/30 to 85/15, and preferably 73/27 to 82/18 and a weight average molecular weight ranging from 5,000 to 800,000, preferably 20,000 to 800,000, more preferably 40,000 to 600,000, and still more preferably 40,000 to 500,000.

The polymer block (i) has a low ethylene content and is therefore generally low crystalline or amorphous. The polymer block (ii) has a high ethylene content and is therefore generally crystalline.

When the polymer blocks (i) and (ii) have an ethylene/α-olefin molar ratio and a weight average molecular weight in the above ranges, the obtainable lubricating oil viscosity modifier enables a lubricating oil composition to show excellent low-temperature properties. The molar ratio of ethylene-derived structural units and α-olefin-derived structural units may be controlled to fall in the above range by adjusting the monomer proportions. The weight average molecular weight may be controlled to fall in the above range by adjusting the polymerization temperature or the ratio of ethylene monomer and chain transfer catalyst.

Preferred embodiments of the copolymers include (i)-(ii)-(i) and (i)-(ii)-(i)-(ii)-(i). The copolymers are generally represented by (i)-[(ii)-(i)]$_n$ wherein n is an integer of 1 or greater, and preferably 1 to 3. The copolymers of the invention are assumed to be mixtures of block copolymers having different values represented by n. Copolymers produced by the method of Patent Document 3 are block copolymers having a single arrangement of monomers as described above.

The copolymers of the present invention may contain structural units derived from other monomers as long as the copolymers contain structural units derived from ethylene and C3-20 α-olefin and satisfy the requirements (1) to (8) while still achieving the objects of the invention. For example, the copolymers according to the specific embodiments described above may contain a polymer block (iii) other than the polymer blocks (i) and (ii). The polymer block (iii) may be a homopolymer block of an olefin selected from ethylene and C3-20 α-olefins, or may be a random copolymer block of two or more olefins selected from C3-20 α-olefins.

[Copolymer Production Processes]

The copolymers of the present invention may be produced by polymerizing ethylene and a C3-20 α-olefin in the presence of two or more polymerization catalysts and a chain transfer catalyst wherein the polymerization catalysts provide polymers with different properties under substantially identical polymerization conditions.

The polymerization catalysts used in the invention are for example transition metal compounds (A-1) and (A-2) described below. The transition metal compounds (A-1) and (A-2) are usually used in combination with at least one compound (B) selected from organometallic compounds (B-1), organoaluminum oxy-compounds (B-2) and ionizing ionic compounds (B-3) capable of reacting with the transition metal compound (A-1) or (A-2) to form an ion pair.

<Transition Metal Compounds (A-1)>

The transition metal compounds (A-1) used in the invention are bridged metallocene compounds represented by Formula [I] below:

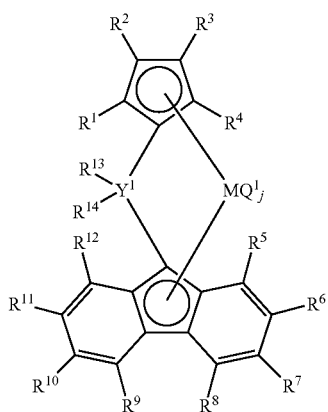

[I]

The bridged metallocene compounds of Formula [I] have two ligands: a cyclopentadienyl group having substituted groups (hereinafter also referred to as the substituted cyclopentadienyl group) and a fluorenyl group.

Substituted Cyclopentadienyl Group

In the substituted cyclopentadienyl group, $R^1$ and $R^3$ are hydrogen atoms, and $R^2$ and $R^4$ are selected from C1-20 hydrocarbon groups (f1) and C1-20 silicon-containing groups (f2).

The C1-20 hydrocarbon groups (f1) include alkyl groups, alkenyl groups, alkynyl groups and aryl groups consisting of carbon and hydrogen alone; heteroatom-containing hydrocarbon groups wherein part of the hydrogen atoms directly bonded to the carbon atoms in the above hydrocarbon groups are substituted by halogen atoms, oxygen-containing groups, nitrogen-containing groups or silicon-containing groups; and hydrocarbon groups wherein any two adjacent hydrogen atoms in the above hydrocarbon groups are substituted by an alicyclic structure.

Specific examples of the hydrocarbon groups (f1) include linear alkyl groups such as methyl, ethyl, n-propyl, allyl, n-butyl, n-pentyl, n-hexyl, n-heptyl, n-octyl, n-nonyl and n-decanyl groups; branched alkyl groups such as isopropyl, tert-butyl, amyl, 3-methylpentyl, 1,1-diethylpropyl, 1,1-dimethylbutyl, 1-methyl-1-propylbutyl, 1,1-dipropylbutyl, 1,1-dimethyl-2-methylpropyl and 1-methyl-1-isopropyl-2-methylpropyl groups; cycloalkyl groups such as cyclopentyl, cyclohexyl, cycloheptyl, cyclooctyl, norbornyl and adamantyl groups; aryl groups such as phenyl, naphthyl, biphenyl, phenanthryl and anthracenyl groups and nuclear-substituted products thereof; arylalkyl groups substituted with an aryl group such as benzyl or cumyl group; and heteroatom-containing hydrocarbon groups such as methoxy, ethoxy, phenoxy, N-methylamino, trifluoromethyl, tribromomethyl, pentafluoroethyl and pentafluorophenyl groups.

The C1-20 silicon-containing groups (f2) include groups that are directly bonded to the ring carbon atom of the cyclopentadienyl group via a direct covalent bonding through a silicon atom, with examples including alkylsilyl groups and arylsilyl groups. Specific examples of the silicon-containing groups (f2) include trimethylsilyl, triethylsilyl and triphenylsilyl groups.

It is preferable that $R^2$ is a C4-20 hydrocarbon group. Examples of the C4-20 hydrocarbon groups include the above-described C1-20 hydrocarbon groups (f1) except methyl, ethyl and propyl groups.

It is preferable that $R^4$ is a C1-10 hydrocarbon group. In order to increase the molecular weight of the obtainable polymer, $R^4$ is more preferably a C1-4 alkyl group such as a methyl, ethyl, n-propyl, isopropyl, n-butyl, isobutyl or sec-butyl group, and is particularly preferably a methyl, ethyl or n-propyl group.

In the most preferred embodiment of the substituted cyclopentadienyl group, $R^4$ is a C2-4 hydrocarbon group and $R^2$ is a substituent group that is bulkier than $R^4$, such as a tert-butyl, methylcyclohexyl or methyladamantyl group. As used herein, the term bulky means that the substituent group occupies a large volume.

Fluorenyl Group

In the fluorenyl group of the bridged metallocene compounds represented by Formula [I], $R^5$, $R^6$, $R^7$, $R^8$, $R^9$, $R^{10}$, $R^{11}$ and $R^{12}$ are each selected from a hydrogen atom, hydrocarbon groups and silicon-containing groups. These substituent groups are the same or different from one another and may be linked together to form a ring. Preferred examples of the hydrocarbon groups include the hydrocarbon groups (f1) described above, and preferred examples of the silicon-containing groups include the silicon-containing groups (f2) described above. In a still more preferred embodiment of the fluorenyl group, $R^6$ and $R^{11}$ are not each a hydrogen atom. In a particularly preferred embodiment of the fluorenyl group, $R^6$ and $R^{11}$ are the same groups other than hydrogen (e.g., the same alkyl groups).

Covalent Bridge

The main chain of the bridge linking the substituted cyclopentadienyl group and the fluorenyl group is a divalent covalent bridge containing one carbon or silicon atom. The bridging atom $Y^1$ in the covalent bridge has $R^{13}$ and $R^{14}$ which may be the same or different from each other. $R^{13}$ and $R^{14}$ are selected from C1-40 hydrocarbon groups and C1-40 silicon-containing groups and may be linked together to form a ring. Examples of the hydrocarbon groups and the silicon-containing groups include the hydrocarbon groups (f1), the silicon-containing groups (f2) and groups corresponding to these groups, in which the hydrogen atoms are substituted by alkyl groups, cycloalkyl groups or aryl groups.

$R^{13}$ and $R^{14}$ may be aryl groups or substituted aryl groups which may be the same or different from each other. [In the description of Formula [I], the term aryl groups means groups composed solely of aromatic ring carbons and aromatic hydrogens (sp2 hydrogens), and the term substituted aryl groups are defined to be groups in which at least one aromatic hydrogen (sp2 hydrogen) of the aryl groups is substituted by a group other than hydrogen.]

Examples of the aryl groups and substituted aryl groups include C6-18 groups composed solely of aromatic ring carbons and aromatic hydrogens (sp2 hydrogens) such as phenyl, naphthyl, anthryl and phenanthryl groups; and substituted aryl groups in which one or more aromatic hydrogens (sp2 hydrogens) are substituted by substituent groups, with specific examples including alkyl- or aryl-substituted C7-30 aryl groups such as tolyl, xylyl, methylnaphthyl, biphenyl and terphenyl groups, C6-20 fluoroaryl groups such as fluorophenyl and difluorophenyl groups, C6-20 chloroaryl groups such as chlorophenyl and dichlorophenyl groups, C6-20 bromoaryl groups such as bromophenyl and dibromophenyl groups, C6-20 iodoaryl groups such as iodophenyl and diiodophenyl groups, C7-40 chloroalkylaryl groups such as (trichloromethyl)phenyl and bis(trichloromethyl)phenyl groups, C7-40 bromoalkylaryl groups such as (tribromomethyl)phenyl and bis(tribromomethyl)phenyl groups, C7-40 iodoalkylaryl groups such as (triiodomethyl)phenyl and bis(triiodomethyl)phenyl groups, and C7-40 fluoroalkylaryl groups such as (trifluoromethyl)phenyl and bis(trifluoromethyl)phenyl groups. Of the substituted aryl groups, meta- or para-substituted phenyl groups are preferable.

It is preferable that $R^{13}$ and $R^{14}$ are selected from C1-5 alkyl groups, phenyl group and C6-10 substituted phenyl groups, and are more preferably selected from methyl, phenyl, tolyl (=methylphenyl) and (trifluoromethyl)phenyl groups.

When $R^4$ in the substituted cyclopentadienyl group is a methyl group, it is preferable that $R^6$ and $R^7$ are linked together to form an alicyclic structure and $R^{10}$ and $R^{11}$ are linked together to form an alicyclic structure, in which case the bridged metallocene compound can afford polymers having a high melting point. In the case where a high molecular weight should be achieved in addition to a high melting point, it is preferable that the bridged metallocene compound has $R^{13}$ and $R^{14}$ that are both substituted aryl groups in addition to the above conditions. When $R^4$ is an ethyl group, it is preferable that $R^{13}$ and $R^{14}$ are both aryl groups or substituted aryl groups, in which case the bridged metallocene compound can afford high molecular weight polymers. In view of easy synthesis of the bridged metallocene compound, it is generally preferable that $R^{13}$ and $R^{14}$ are identical.

Other Structural Features of Bridged Metallocene Compounds

In Formula [I], M is Ti, Zr or Hf, and is preferably Zr or Hf.

$Q^1$ at each occurrence is a halogen atom, a C1-10 hydrocarbon group, a neutral and conjugated or non-conjugated diene of 10 or less carbon atoms, an anionic-ligand or a neutral ligand capable of coordination by lone pair electrons. Examples of the halogen atoms include fluorine, chlorine, bromine and iodine. Examples of the hydrocarbon groups include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl and 1-methyl-1-cyclohexyl groups.

Examples of the neutral and conjugated or non-conjugated dienes of 10 or less carbon atoms include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene.

Examples of the anionic ligands include alkoxy groups such as methoxy, tert-butoxy and phenoxy; carboxylate groups such as acetate and benzoate; and sulfonate groups such as mesylate and tosylate. Examples of the neutral ligands capable of coordination by lone electron pairs include organophosphorus compounds such as trimethylphosphine, triethylphosphine, triphenylphosphine and diphenylmethylphosphine; and ethers such as tetrahydrofuran, diethyl ether, dioxane and 1,2-dimethoxyethane. The letter j is an integer of 1 to 4. When j is 2 or greater, the plurality of $Q^1$ may be the same or different.

The transition metal compounds represented by Formula [I] are known and are described in detail in WO 2006/025540.

The transition metal compounds (A-1) catalyze polymerization of ethylene and a C3-20 α-olefin to afford a polymer having a higher content of α-olefin-derived structural units compared with the transition metal compounds (A-2) below under substantially identical polymerization conditions.

<Transition Metal Compounds (A-2)>

The transition metal compounds (A-2) used in the invention are bridged metallocene compounds represented by Formula [II] below:

[Chem. 2]

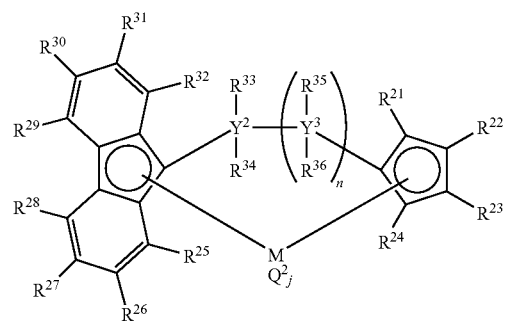

[II]

In Formula [II], $R^{21}$, $R^{22}$, $R^{23}$, $R^{24}$, $R^{25}$, $R^{26}$, $R^{27}$, $R^{28}$, $R^{29}$, $R^{30}$, $R^{31}$ and $R^{32}$ are selected from a hydrogen atom, hydrocarbon groups and silicon-containing groups and may be the same or different from one another. Adjacent substituent groups of $R^{25}$ to $R^{32}$ may be linked together to form a ring.

Examples of the hydrocarbon groups include C1-20 alkyl groups, C7-20 arylalkyl groups and C6-20 aryl groups. Specific examples include linear alkyl groups such as methyl, ethyl, n-propyl, isopropyl, allyl, n-butyl, amyl, n-pentyl, n-hexyl, n-heptyl, n-octyl, n-nonyl and n-decanyl groups; branched alkyl groups such as tert-butyl, 3-methylpentyl, 1,1-diethylpropyl, 1,1-dimethylbutyl, 1-methyl-1-propylbutyl, 1,1-dipropylbutyl, 1,1-dimethyl-2-methylpropyl and 1-methyl-1-isopropyl-2-methylpropyl groups; cycloalkyl groups such as cyclopentyl, cyclohexyl, cycloheptyl, cyclooctyl, norbornyl and adamantyl groups; aryl groups such as phenyl, naphthyl, biphenyl, phenanthryl and anthracenyl groups; arylalkyl groups such as benzyl and cumyl groups; and methoxy, ethoxy, phenoxy, N-methylamino, N,N-dimethylamino and N-phenylamino groups.

Examples of the silicon-containing groups include trimethylsilyl, triethylsilyl, diphenylmethylsilyl and dimethylphenylsilyl groups.

Of $R^{25}$ to $R^{32}$ on the fluorene ring, adjacent groups may be linked together to form a ring. Examples of such substituted fluorenyl groups include benzofluorenyl, dibenzofluorenyl, octamethyloctahydrodibenzofluorenyl and octamethyltetrahydrodicyclopentafluorenyl groups.

In the bridged metallocene compounds of Formula [II], it is important that when n is 1, $R^{21}$ to $R^{36}$ are not all hydrogen atoms at the same time. When n is 1, at least one of $R^{21}$ to $R^{36}$ is a hydrocarbon group or a silicon-containing group whereby high polymerization activity is achieved. The substituent groups $R^{21}$ to $R^{36}$ may be the same or different from one another. In a preferred embodiment of the bridged metallocene compounds in view of polymerization activity, any two or more substituent groups of $R^{26}$, $R^{27}$, $R^{30}$ and $R^{31}$ are C1-20 hydrocarbon groups. The C1-20 hydrocarbon groups include methyl, ethyl, n-propyl, isopropyl, allyl, n-butyl, tert-butyl, amyl and n-pentyl groups. In view of easy synthesis of the ligand the ligand is preferably symmetric, that is, $R^{26}$ and $R^{31}$ are identical, and $R^{27}$ and $R^{30}$ are identical. Such preferred embodiments include bridged metallocene compounds in which $R^{26}$ and $R^{27}$ form an alicyclic structure and $R^{30}$ and $R^{31}$ form an identical alicyclic structure.

$Y^2$ and $Y^3$ are each a Group 14 atom and may be the same or different from each other. Examples of the Group 14 atoms include carbon, silicon, germanium and tin, with carbon and silicon being preferred. In particular, $Y^2$ and $Y^3$ are more preferably the same atoms. $R^{33}$, $R^{34}$ $R^{35}$ and $R^{36}$ are each a hydrogen atom or a hydrocarbon group. The hydrocarbon groups are as described hereinabove.

The letter n is an integer of 1 to 3, and is preferably 1. $R^{33}$ and $R^{35}$ may be linked together to form a ring. At the same time when $R^{33}$ and $R^{35}$ are linked together to form a ring, $R^{34}$ and $R^{36}$ may be linked together to form a ring. When n is 1, $R^{33}$ and adjacent $R^{35}$ may form a ring. When n is 2, $R^{33}$ and $R^{35}$ at the adjacent position α-position) or β-position with respect to $Y^2$ may form a ring. When n is 3, $R^{33}$ and $R^{35}$ at the adjacent position α-position), β-position or γ-position with respect to $Y^2$ may form a ring. These conditions also apply to $R^{34}$ and $R^{36}$ forming a ring. When n is 1, $R^{34}$ and adjacent $R^{36}$ may form a ring. When n is 2, $R^{34}$ and $R^{36}$ at the adjacent position (α-position) or β-position with respect to $Y^2$ may form a ring. When n is 3, $R^{34}$ and $R^{36}$ at the adjacent position (α-position), β-position or γ-position with respect to $Y^2$ may form a ring.

M is Ti, Zr or Hf.

$Q^2$ at each occurrence is a halogen atom, a hydrocarbon group, an anionic ligand or a neutral ligand capable of coordination by lone pair electrons.

The letter j is an integer of 1 to 4. When j is 2 or greater, the plurality of $Q^2$ may be the same or different from one another.

Examples of the halogen atoms include fluorine, chlorine, bromine and iodine. Examples of the hydrocarbon groups are as described hereinabove.

Examples of the anionic ligands include alkoxy groups such as methoxy, tert-butoxy and phenoxy; carboxylate groups such as acetate and benzoate; and sulfonate groups such as mesylate and tosylate.

Examples of the neutral ligands capable of coordination by lone electron pairs include organophosphorus compounds such as trimethylphosphine, triethylphosphine, triphenylphosphine and diphenylmethylphosphine; and ethers such as tetrahydrofuran, diethyl ether, dioxane and 1,2-dimethoxyethane. It is preferable that at least one $Q^2$ is a halogen atom or an alkyl group.

The transition metal compounds represented by Formula [II] are known and are described in detail in JP-A-2004-175707.

Further, ethylene(cyclopentadienyl)(fluorenyl) zirconium dichloride described in Journal of Organometallic Chemistry 561 (1998) 37-47 may be used as the transition metal compound (A-2).

<Organometallic Compounds (B-1)>

Examples of the organometallic compounds (B-1) in the invention include organometallic compounds containing Group 1, Group 2 or Group 13 elements of the periodic table, as represented by the following formulae.

(B-1a) Organoaluminum compounds represented by:

wherein $R^a$ and $R^b$ may be the same or different and are each a C1-15 hydrocarbon group, and preferably a C1-4 hydrocarbon group; X is a halogen atom; $0<m\leq3$, $0\leq n\leq3$, $0\leq p\leq3$, $0\leq q\leq3$ and $m+n+p+q=3$.

(B-1b) Alkyl complex compounds containing a Group 1 metal of the periodic table and aluminum, as represented by:

wherein $M^2$ is Li, Na or K; and $R^a$ is a C1-15 hydrocarbon group, and preferably a C1-4 hydrocarbon group.

(B-1c) Compounds represented by:

wherein $R^a$ and $R^b$ may be the same or different from each other and are each a C1-15 hydrocarbon group, and preferably a C1-4 hydrocarbon group; and $M^3$ is Mg.

Compounds analogous to the compounds (B-1a) may also be used. Examples of such compounds include organoaluminum compounds in which two or more aluminum compounds are linked though a nitrogen atom, such as $(C_2H_5)_2AlN$ $(C_2H_5)Al(C_2H_5)_2$.

Examples of the organometallic compounds (B-1) further include methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium.

Further, compounds capable of forming the organoaluminum compounds as described above in the polymerization system may be used, with examples including combinations of aluminum halides and alkyllithiums and combinations of aluminum halides and alkylmagnesiums.

Of the organometallic compounds (B-1), the organoaluminum compounds are preferable. The organometallic compounds (B-1) may be used singly, or two or more kinds may be used in combination.

<Organoaluminum Oxy-Compounds (B-2)>

The organoaluminum oxy-compounds (B-2) may be conventional aluminoxanes (alumoxanes) or benzene-insoluble organoaluminum oxy-compounds as described in JP-A-H02-78687.

<Compounds (B-3) Reacting with Transition Metal Compound (A-1) or (A-2) to Form Ion Pair>

Examples of the compounds (B-3) capable of reacting with the transition metal compounds (A-1) or (A-2) to form an ion pair (hereinafter, also referred to as the ionizing ionic compounds) include Lewis acids, ionic compounds, borane compounds and carborane compounds as described in JP-A-H01-501950, JP-A-H01-502036, JP-A-H03-179005, JP-A-H03-179006, JP-A-H03-207703, JP-A-H03-207704, and U.S. Pat. No. 5,321,106. Heteropoly compounds and isopoly compounds may also be employed.

The polymerization catalyst system according to the present invention contains the transition metal compounds (A-1) and (A-2) optionally together with at least one compound (B) (hereinafter, also referred to as the component (B)) selected from the organometallic compounds (B-1), the organoaluminum oxy-compounds (B-2) and the ionizing ionic compounds (B-3) and may further contain a carrier (C) and/or an organic compound (D) as required.

<Carriers (C)>

The carrier (C) optionally used in the invention is an inorganic or organic compound in the form of granular or fine particulate solid. Preferred inorganic compounds include porous oxides, inorganic halides, clays, clay minerals and ion-exchangeable layered compounds.

<Organic Compound Components (D)>

In the present invention, the organic compound components (D) may be optionally used to improve polymerization performance and properties of the obtainable polymers. Examples of the organic compounds include alcohols, phenolic compounds, carboxylic acids, phosphorus compounds and sulfonates.

<Chain Transfer Catalysts>

The chain transfer catalysts used in the invention include chain transfer agents and shuttling agents. Some compounds function as chain transfer agents or shuttling agents depending on the combination with the polymerization catalysts.

The chain transfer agents refer to compounds that facilitate chain transfer reaction. They are usually used in polymerization to control the molecular weight.

The term, "shuttling agent" refers to a compound or mixture of compounds employed in the catalyst composition of the present invention that is capable of causing polymeryl exchange between at least two active catalyst sites of the catalysts included in the catalyst composition under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. Preferably, the shuttling agent has an activity ratio $R_{A-B}/R_{B-A}$ of from 0.01 to 100, more preferably from 0.1 to 10, most preferably from 0.5 to 2.0, and most highly preferably from 0.8 to 1.2, wherein $R_{A-B}$ is the rate of polymeryl transfer from catalyst A active site to catalyst B active site via the shuttling agent, and $R_{B-A}$ is the rate of reverse polymeryl transfer, i.e., the rate of exchange starting from the catalyst B active site to catalyst A active site via the shuttling agent. Desirably, the intermediate formed between the shuttling agent and the polymeryl chain is sufficiently stable that chain termination is relatively rare. Desirably, less than 90 percent, preferably less than 75 percent, more preferably less than 50 percent and most desirably less than 10 percent of shuttle-polymeryl products are terminated prior to attaining 3 distinguishable polymer segments or blocks. Ideally, the rate of chain shuttling (defined by the time required to transfer a polymer chain from a catalyst site to the chain shuttling agent and then back to a catalyst site) is equivalent to or faster than the rate of polymer termination, even up to 10 or even 100 times faster than the rate of polymer termination. This permits polymer block formation on the same time scale as polymer propagation.

By selecting different combinations of catalysts having differing comonomer incorporation rates as well as differing reactivities, and by pairing various shuttling agents or mixtures of agents with these catalyst combinations, polymer products having segments of different densities or comonomer concentrations, different block lengths, and different numbers of such segments or blocks in each copolymer can be prepared. For example, if the activity of the shuttling agent is low relative to the catalyst polymer chain propagation rate of one or more of the catalysts, longer block length multi-block copolymers and polymer blends may be obtained. Contrariwise, if shuttling is very fast relative to polymer chain propagation, a copolymer having a more random chain structure and shorter block lengths is obtained. An extremely fast shuttling agent may produce a multi-block copolymer having substantially random copolymer properties. By proper selection of both catalyst mixture and shuttling agent, relatively pure block copolymers, copolymers containing relatively large polymer segments or blocks, and/or blends of the foregoing with various ethylene homopolymers and/or copolymers can be obtained.

Examples of the chain transfer agents include mercaptans such as octyl mercaptan, n-dodecyl mercaptan, t-dodecyl mercaptan, n-hexadecyl mercaptan, n-tetradecyl mercaptan and t-tetradecyl mercaptan; tetraethylthiuram sulfide, carbon tetrachloride, ethylene bromide and pentaphenylethane; acrolein, methacrolein, allyl alcohols, 2-ethylhexyl thioglycol and α-methylstyrene dimer.

Examples of the chain transfer agents further include hydrogen, organosilicon compounds and dialkylzinc compounds.

Examples of the organosilicon compounds include compounds described in Angew. Chem. Int. Ed, 47, 2-22 (2008). Further, organosilicon compounds represented by Formula (III) below may be used.

$$R^a R^b R^c SiH \qquad (III)$$

In the above formula, $R^a$, $R^b$ and $R^C$ may be the same or different and are each a hydrogen atom; a C1-4 alkyl group such as methyl, ethyl, propyl, isopropyl, butyl, isobutyl or tert-butyl; a C6-12 aryl group such as phenyl or tolyl; a C7-20 alkylaryl group such as ethylphenyl or ethyltolyl; a C7-20 arylalkyl group such as phenylethyl or benzyl; a C1-4 alkoxy group such as methoxy, ethoxy, propoxy or butoxy; a C3-6 fluoroalkyl group such as 3,3,3-trifluoropropyl; a dialkylamino group wherein each alkyl group has 1 to 4 carbon atoms such as dimethylamino; or a diorganopolysiloxane chain represented by $R^f_3SiO(SiR^f_2O)_n$— that contains 1 to 10 siloxane units (wherein $R^f$ is methyl, phenyl, 3,3,3-trifluoropropyl, methoxy or ethoxy, and n is an integer of 0 to 9). Of these, hydrogen, methyl, ethyl, isopropyl, isobutyl, 3,3,3-trifluoropropyl, dimethylamino and $R^f_3SiO(SiR^f_2O)_n$— are preferred.

Preferred examples of the organosilicon compounds represented by Formula (III) include phenylsilane, diphenylsilane, phenylmethylsilane, pentamethyldisiloxane, methylsilane and dimethylsilane.

Examples of the dialkylzinc compounds include compounds described in Ziegler-Natta Catalysts and Polymerization/John Boor, Jr. (1979).

Further, dialkylzinc compounds represented by Formula (IV) below may be used:

$$ZnR^dR^e \quad (IV)$$

wherein $R^d$ and $R^e$ may be the same or different from each other and are C1-20 alkyl groups such as methyl, ethyl, propyl, isopropyl, butyl, isobutyl, tert-butyl, hexyl, octyl, nonyl, decyl, dodecyl and eicosyl.

Of these, the alkyl groups having 1 to 12 carbon atom(s) are preferable, and those having 1 to 6 carbon atom(s) are more preferable.

Preferred examples of the dialkylzinc compounds of Formula (III) include diethylzinc, diisobutylzinc and di-n-decylzinc, with diethylzinc being particularly preferable.

Suitable shuttling agents for use herein include Group 1, 2, 12 or 13 metal compounds or complexes containing at least one C1-20 hydrocarbyl group, preferably hydrocarbyl substituted aluminum, gallium or zinc compounds containing from 1 to 12 carbons in each hydrocarbyl group, and reaction products thereof with a proton source. Preferred hydrocarbyl groups are alkyl groups, preferably linear or branched, C2-8 alkyl groups.

Examples of the aluminum compounds include compounds described in Macromolecules, 33, 9192-9199 (2000).

Most preferred shuttling agents for use in the present invention are trialkyl aluminum and dialkyl zinc compounds, especially trimethylaluminum, triethylaluminum, tri(i-propyl)aluminum, tri(i-butyl)aluminum, tri(n-hexyl)aluminum, tri(n-octyl)aluminum, triethylgallium, or diethylzinc. Additional suitable shuttling agents include the reaction product or mixture formed by combining the foregoing organometal compound, preferably a tri(C1-8) alkyl aluminum or di(C1-8) alkyl zinc compound, especially triethylaluminum, tri(i-propyl)aluminum, tri(i-butyl)aluminum, tri(n-hexyl)aluminum, tri(n-octyl)aluminum, or diethylzinc, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl)amine, 2,6-di(t-butyl) phenol, ethyl(1-naphthyl)amine, bis(2,3,6,7-dibenzo-1-azacycloheptaneamine), or 2,6-diphenylphenol. Desirably, sufficient amine or hydroxyl reagent is used such that one hydrocarbyl group remains per metal atom.

The primary reaction products of the foregoing combinations most desired for use in the present invention as shuttling agents are n-octylaluminum di(bis(trimethylsilyl)amide), i-propylaluminum bis(dimethyl(t-butyl)siloxide), and n-octylaluminum di(pyridinyl-2-methoxide), i-butylaluminum bis(dimethyl(t-butyl)siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl (1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis (dimethyl(t-butyl)siloxide), ethylzinc (2,6-diphenylphenoxide), and ethylzinc (t-butoxide).

It will be appreciated by the skilled artisan that a suitable shuttling agent for one catalyst or catalyst combination may not necessarily be as good or even satisfactory for use with a different catalyst or catalyst combination. Some potential shuttling agents may adversely affect the performance of one or more catalysts and may be undesirable for use for that reason as well. Accordingly, the activity of the chain shuttling agent desirably is balanced with the catalytic activity of the catalysts to achieve the desired polymer properties. In some embodiments of the invention, best results may be obtained by use of shuttling agents having a chain shuttling activity (as measured by a rate of chain transfer) that is less than the maximum possible rate.

The chain transfer catalysts may be used singly, or two or more kinds may be used in combination.

<Polymerization Conditions>

The polymerization in the invention may be carried out by liquid-phase polymerization such as solution polymerization or suspension polymerization, or by gas-phase polymerization. The liquid-phase polymerization may involve inert hydrocarbon solvents. Examples of the inert hydrocarbon solvents include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; and mixtures of these hydrocarbons. The olefin to be polymerized can be used as a solvent.

In the polymerization of ethylene and a C3-20 α-olefin with the polymerization catalysts described above, the transition metal compounds (A-1) and (A-2) are generally used such that the total amount thereof per liter of the reaction volume is in the range of $10^{-12}$ to 1 mol, and preferably $10^{-10}$ to $10^{-2}$ mol. The component (B-1) may be used such that the molar ratio [(B-1)/M] of the component (B-1) to all the transition metal atoms (M) in the transition metal compounds (A-1) and (A-2) is generally in the range of 0.01 to 100,000, and preferably 0.05 to 50,000. The component (B-2) may be used such that the molar ratio [(B-2)/M] of the aluminum atoms in the component (B-2) to all the transition metal atoms (M) in the transition metal compounds (A-1) and (A-2) is generally in the range of 10 to 500,000, and preferably 20 to 100,000. The component (B-3) may be used such that the molar ratio [(B-3)/M] of the component (B-3) to all the transition metal atoms (M) in the transition metal compounds (A-1) and (A-2) is generally in the range of 1 to 10, and preferably 1 to 5.

The component (D) may be used in the following manners. When the component (B) is the component (B-1), the component (D) may be used such that the molar ratio [(D)/(B-1)] is generally in the range of 0.01 to 10, and preferably 0.1 to 5. When the component (B) is the component (B-2), the component (D) may be used such that the molar ratio [(D)/(B-2)] is generally in the range of 0.001 to 2, and preferably 0.005 to 1. When the component (B) is the component (B-3), the component (D) may be used such that the molar ratio [(D)/(B-3)] is generally in the range of 0.01 to 10, and preferably 0.1 to 5.

The chain transfer catalyst may be used such that the molar ratio [chain transfer catalyst/M] of the chain transfer catalyst to all the transition metal atoms (M) in the transition metal compounds (A-1) and (A-2) is generally in the range of 0.01 to 10,000, and preferably 0.01 to 5,000.

The molecular weight of the obtainable copolymer may be controlled by adjusting the monomers/catalysts ratio or the polymerization time. The copolymers described hereinabove may be suitably used as lubricating oil viscosity modifiers.

[Lubricating Oil Compositions]

The lubricating oil compositions according to the present invention contain the above-described copolymer as a lubricating oil viscosity modifier, a lubricating oil basestocks and optionally a pour-point depressant.

The components of the lubricating oil compositions will be described below.

<Lubricating Oil Basestocks>

Examples of the lubricating oil basestocks include mineral oils; poly-α-olefins; diesters such as polyol esters, dioctyl phthalate and dioctyl sebacate; and synthetic oils such as polyalkylene glycols. It is preferable to use mineral oils or blends of mineral oils and synthetic oils.

In general, mineral oils are used after purification process such as dewaxing and are classified into several grades depending on how they are purified. Mineral oils having a wax content of 0.5 to 10% are usually used. For example, there may be used highly purified oils, which are produced by hydrocracking, have a low pour point and a high viscosity index, and have composition based on isoparaffin. Mineral oils having a kinematic viscosity at 40° C. of 10 to 200 cSt are usually used.

<Pour-Point Depressants>

Examples of the pour-point depressants for optional use in the invention include alkylnaphthalenes, alkyl methacrylate (co)polymers, alkyl acrylate (co)polymers, alkyl fumarate/vinyl acetate copolymers, α-olefin polymers, and α-olefin/styrene copolymers, with the alkyl methacrylate (co)polymers and alkyl acrylate (co)polymers being preferable.

<Compositions>

The lubricating oil compositions of the present invention contain the above-described lubricating oil basestock and copolymer and optionally contain the pour-point depressant. When the lubricating oil composition contains the lubricating oil basestock and the copolymer, the copolymer preferably accounts for 1 to 30 wt %, and more preferably 1 to 20 wt % of the lubricating oil composition (the remaining percentage is accounted for by the lubricating oil basestock and additives described later).

Such lubricating oil compositions not only have excellent low-temperature properties but also have excellent shear stability. The lubricating oil compositions may be used as lubricating oils directly, or the pour-point depressant and other additives may be added to the lubricating oil compositions.

When the lubricating oil composition contains the lubricating oil basestock, the copolymer and the pour-point depressant, the composition desirably contains the copolymer at 0.1 to 5 wt %, preferably 0.2 to 1.5 wt %, more preferably 0.25 to 1.5 wt %, and particularly preferably 0.30 to 1.5 wt %, and the pour-point depressant at 0.05 to 3 wt %, preferably 0.1 to 3 wt %, more preferably 0.1 to 2 wt %, and most preferably 0.2 to 1.5 wt % (the remaining percentage is accounted for by the lubricating oil basestock and additives described later).

The copolymer used at the above proportion provides high viscosity-increasing effects and ensures that the lubricating oil composition shows good flowability at low temperatures.

The lubricating oil compositions may contain additives in addition to the lubricating oil basestock, copolymer and pour-point depressant. Exemplary additives are detergent dispersants, viscosity index-increasing agents such as alkyl methacrylate (co)polymers, hydrogenated SBR and SEBS, rust inhibitors, extreme pressure agents, anti-foaming agents, antioxidants, metal deactivators and antiwear agents.

The detergent dispersants include metal sulfonates such as calcium sulfonate, magnesium sulfonate and barium sulfonate; thiophosphonates, phenates, salicylates, succinimides, benzylamines and succinates.

The extreme pressure agents include sulfur extreme pressure agents such as sulfides, sulfoxides, sulfones, thiophosphinates, thiocarbonates, sulfurized oils and fats, and sulfurized olefins; phosphoric acids such as phosphates, phosphites, phosphate amine salts and phosphite amine salts; and halogenated compounds such as chlorinated hydrocarbons.

The antiwear agents include inorganic or organic molybdenum compounds such as molybdenum disulfide; organoboron compounds such as alkylmercaptyl borates; graphites, antimony sulfide, boron compounds and polytetrafluoroethylene.

The antioxidants include amine compounds such as 2,6-di-tert-butyl-4-methylphenol; and sulfur or phosphorus compounds such as zinc dithiophosphate. The rust inhibitors include carboxylic acids such as oxalic acid and salts thereof; sulfonates; esters; alcohols; phosphoric acid and salts thereof; benzotriazole and derivatives thereof; and thiazole compounds.

The anti-foaming agents include silicone compounds such as dimethylsiloxane and silica gel dispersions; alcohols; and esters.

The amount of these additives is variable depending on desired lubricating performance, but is generally 0.01 to 50 parts by weight, and preferably 0.05 to 30 parts by weight based on 100 parts by weight of the lubricating oil composition.

The lubricating oil composition of the invention may be prepared by mixing or dissolving the copolymer optionally together with the pour-point depressant and additives in the lubricating oil basestock by known methods.

The copolymers of the present invention are lubricating oil viscosity modifiers whereby lubricating oil compositions having excellent low-temperature properties are obtained. By using the lubricating oil viscosity modifiers of the invention, lubricating oil compositions having excellent low-temperature properties are obtained.

EXAMPLES

The present invention will be described based on examples in detail hereinbelow without limiting the scope of the invention.

[Measurement Methods]

(Chemical Composition of Copolymer)

Nuclear magnetic resonator LA 500 (NMR) manufactured by JEOL Ltd. was used. The standard of chemical shift was a main-chain methylene peak (29.73 ppm). Into a commercially available NMR quartz glass tube 10 mm in diameter, 250-400 mg of the sample and 3 ml of a liquid mixture containing orthodichlorobenzene (Wako Pure Chemical Industries, Ltd.) and benzene-d6 (ISOTEC) in a 4:1 volume ratio were added. These materials were heated at 120° C. to give a uniform dispersion. The dispersion was analyzed at a pulse width of 45° and a pulse repetition time of 5.5 sec.

(DSC for Copolymer)

A differential scanning calorimeter (DSC) manufactured by Seiko Instruments Inc. was calibrated with indium. The copolymer was pressed at 200° C. to give a thin film, and approximately 10 mg of the film was weighed out and was placed on a DSC aluminum pan. The pan was then tightly closed by crimping a lid thereto. The sample pan was placed into a DSC cell, and an empty aluminum pan as a reference was placed. The temperature was increased to 150° C. at a temperature increasing rate of approximately 50° C./min under a nitrogen atmosphere, and was held constant at the temperature for about 5 minutes. The temperature was then lowered to −100° C. at a temperature decreasing rate of approximately 10° C./min, and was held constant at the temperature for about 5 minutes. Thereafter, the sample was heated at a temperature increasing rate of approximately 10° C./min until it was completely molten. An enthalpy curve was recorded during the cooling process, and the peak top temperature in the curve was obtained as a DSC crystallization temperature Tc. When there were two or more peaks, the temperature of the peak top that was most distant from the baseline was obtained as Tc. From the enthalpy curve recorded during the last heating process, the melting point (Tm) and the heat of fusion (ΔH) were determined from the peak top temperature and the peak area, respectively, and the half-value width ($\Delta T_{half}$) of the melting peak was determined. When there were two or more peaks, the temperature of the peak top that was most distant from the baseline was obtained as Tm.

In the case where there were two or more peaks and these peaks were not completely separate from one another (that is, the enthalpy curve indicated a plurality of peaks without returning to the baseline each time), the heat of fusion (ΔH) was obtained as a total area of the two or more peaks, and the half-value width ($\Delta T_{half}$) was determined based on the peak top temperature corresponding to Tm while the overlapping peaks were regarded as a single peak. In detail, the half-value width in this case was obtained by determining the difference between the temperatures at which half the height of the peak top indicating the melting point (Tm) was reached first and last.

In the case where there were two or more peaks and these peaks were completely separate from one another (that is, the enthalpy curve indicated a plurality of peaks while returning to the baseline each time), the heat of fusion (ΔH) was obtained by determining the area of the peak indicating the melting point (Tm), and the half-value width ($\Delta T_{half}$) was determined based on the peak indicating the melting point (Tm). In an embodiment of the present invention, when there are two or more peaks in a DSC curve, the peaks are not completely separate from one another.

(GPC for Copolymer)

The number average molecular weight (Mn) and weight average molecular weight (Mw) were measured using a gel permeation chromatograph (GPC) from Waters that had been calibrated with standard substances (monodispersed polystyrenes) of known molecular weights. The separation columns were TSK gel GMH6-HT and TSK gel GMH6-HTL each 7.5 mm in inner diameter and 600 mm in length. The column temperature was 140° C. The mobile phase consisted of orthodichlorobenzene (Wako Pure Chemical Industries, Ltd.) and 0.025 wt % of BHT (Takeda Pharmaceutical Company Limited) as an antioxidant. The mobile phase was pumped at 1.0 ml/min. The sample concentration was 0.1 wt %. The sample injection amount was 500 μl. A differential refractometer was used as a detector. The peaks were separated with data processor SC8010 manufactured by TOSOH CORPORATION. A minimum point between peaks was determined, and a perpendicular line was drawn therefrom to the baseline. Mn, Mw and Mw/Mn were determined with respect to each peak, and an intensity ratio between peaks was calculated.

(Measurement of Copolymer's $T_{crystaf}$)

$T_{crystaf}$ refers to a crystallization temperature measured by a CRYSTAF method. In the invention, it was measured with CRYSTAF 200+ manufactured by Polymer ChAR. The sample was dissolved in orthodichlorobenzene to a concentration of 0.66 mg/ml. The solution was allowed to stand at 160° C. for 1 hour and then at 95° C. for 45 minutes, and was cooled to −20° C. at a temperature decreasing rate of 0.2° C./min. The concentration of polymers precipitated during the measurement was detected with an infrared detector attached to the CRYSTAF apparatus. The precipitation of polymers was detected on line constantly, and the precipitation amount was plotted against temperature. Polymers fractionated at 95 to −20° C., and polymers fractionated at below −20° C. were quantitatively determined. In a polymer fraction quantitative curve, the temperature of the peak top appearing between 95° C. and −20° C. was defined as a crystallization temperature ($T_{crystaf}$).

(Density of Copolymer)

After measurement of MFR at 190° C. under 2.16 kg load, a copolymer strand was heat treated at 120° C. for 1 hour and was gradually cooled slowly to room temperature in 1 hour. The density thereof was measured by a density gradient tube method. MFR was measured in accordance with ASTM D 1238-65T.

(Kinematic Viscosity at 100° C.)

The kinematic viscosity of the lubricating oil composition at 100° C. was measured in accordance with ASTM D 445. The lubricating oil compositions in Examples of the present invention were prepared so that the kinematic viscosity (KV) would be about 15 mm$^2$/sec.

(Mini Rotary (MR) Viscosity)

The MR viscosity of the lubricating oil composition was measured at −30° C. in accordance with ASTM D 4684. The MR viscosity is used in the evaluation for an oil pump to perform pumping at low temperatures. The lower the value, the more excellent the low-temperature properties of the lubricating oil.

(Cold Cranking Simulator (CCS) Viscosity)

The CCS viscosity of the lubricating oil composition was measured at −25° C. in accordance with ASTM D 2602. The CCS viscosity is used in the evaluation of slidability (startability) of a crankshaft at low temperatures. The lower the value, the more excellent the low-temperature properties of the lubricating oil.

(Low-Temperature Flowability (Low-Temperature Storage Stability))

The lubricating oil composition was cooled at −18° C. for 1 month, and flowability (appearance) was observed and evaluated based on the following criteria:

AA: The composition flowed.
CC: The composition was gelled.

Example 1

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.001 mmol/ml hexane solution of diethylzinc (manufactured by KANTO CHEMICAL CO., INC.) was continuously supplied at 750 ml/h. Further, a 0.07 mmol/ml solution of methylaluminoxane (TMAO-341 manufactured by Tosoh Finechem Corporation) as a cocatalyst was continuously supplied at 43 ml/h. Furthermore, a 0.000035 mmol/ml hexane solution of diphenylmethylene(3-tert-butyl-5-methylcyclopentadienyl) (2,7-di-tert-butylfluorenyl)zirconium dichloride and a 0.000105 mmol/ml solution of ethylene(cyclopentadienyl) (fluorenyl)zirconium dichloride were continuously supplied each at 43 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 36 NL/h and 0.24 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The properties of the copolymer are set forth in Table 1.

Example 2

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.0016 mmol/ml hexane solution of diethylzinc (manufactured by KANTO CHEMICAL CO., INC.) was continuously supplied at 750 ml/h. Further, a 0.06 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl) zirconium dichloride and a 0.00006 mmol/ml solution of ethylene(cyclopentadienyl) (fluorenyl)zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 36 NL/h and 0.24 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The properties of the copolymer are set forth in Table 1.

Example 3

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.0016 mmol/ml hexane solution of diethylzinc (manufactured by KANTO CHEMICAL CO., INC.) was continuously supplied at 750 ml/h. Further, a 0.09 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl)zirconium dichloride and a 0.00012 mmol/ml solution of ethylene(cyclopentadienyl) (fluorenyl)zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 36 NL/h and 0.24 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The properties of the copolymer are set forth in Table 1.

Example 4

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.0016 mmol/ml hexane solution of diethylzinc (manufactured by KANTO CHEMICAL CO., INC.) was continuously supplied at 750 ml/h. Further, a 0.12 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl) zirconium dichloride and a 0.00018 mmol/ml solution of ethylene(cyclopentadienyl) (fluorenyl)zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 36 NL/h and 0.24 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The properties of the copolymer are set forth in Table 1.

Example 5

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.0016 mmol/ml hexane solution of diethylzinc (manufactured by KANTO CHEMICAL CO., INC.) was continuously supplied at 750 ml/h. Further, a 0.06 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl) zirconium dichloride and a 0.00006 mmol/ml solution of ethylene(cyclopentadienyl) (fluorenyl)zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 41 NL/h and 0.24 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The properties of the copolymer are set forth in Table 1.

TABLE 1

|  |  | Example 1 | Example 2 | Example 3 | Example 4 | Example 5 |
|---|---|---|---|---|---|---|
| Ethylene content | mol % | 65.2 | 56.3 | 61.5 | 67.8 | 56.9 |
| Mw × 10$^4$ | g/mol | 11.9 | 11.3 | 11.8 | 11.5 | 11.2 |
| Mw/Mn |  | 1.9 | 2.0 | 2.0 | 1.9 | 2.0 |
| Density | g/cm$^3$ | 0.858 | 0.858 | 0.861 | 0.865 | 0.861 |
| Tm | ° C. | 30.2 | 40.6 | 40.5 | 40.9 | 48.9 |
| 1073 × Density − 893 |  | 27.6 | 27.6 | 30.9 | 35.1 | 30.9 |
| ΔH | J/g | 33 | 14 | 24 | 34 | 16 |
| ΔT$_{half}$ | ° C. | 61.1 | 65.2 | 62.9 | 59.3 | 62.7 |
| −0.71 × Tm + 101.4 |  | 80.0 | 72.6 | 72.6 | 72.4 | 66.7 |
| Tc | ° C. | 18.1 | 28.7 | 28.1 | 29.4 | 38.2 |
| T$_{crystaf}$ | ° C. | −11.5 | −3.5 | −3.2 | −2.9 | 0.1 |
| Tc − T$_{crystaf}$ | ° C. | 29.6 | 32.2 | 31.3 | 32.3 | 38.1 |
| 0.028 × ΔH + 25.3 |  | 26.2 | 25.7 | 26.0 | 26.3 | 25.7 |

Comparative Example 1

A thoroughly nitrogen-purged 1 L continuous pressure polymerization reactor equipped with a stirring blade was charged with 1 L of dehydrated and purified n-hexane. By continuously feeding n-hexane at 0.53 L/h, the total pressure was increased to 3.6 MPa. A 0.0003 mmol/ml hexane solution of methylaluminoxane (MMAO-3A manufactured by Tosoh Finechem Corporation) was continuously supplied at 186 ml/h, and a 0.0009 mmol/ml hexane solution of diethylzinc (manufactured by KANTO CHEMICAL CO., INC.) was continuously supplied at 625 ml/h. Further, a 0.00038 mmol/ml solution of triphenylcarbenium(tetrakispentafluorophenyl) borate (manufactured by ASAHI GLASS CO., LTD.) as a cocatalyst was continuously supplied at 81 ml/h. Furthermore, a 0.00026 mmol/ml hexane solution of [N-(2,6-di(1-methylethyl)phenylamido)(2-methylphenyl) (1,2-phenylene-(6-pyridine-2-diyl)methane)]hafnium dimethyl and a 0.00019 mmol/ml solution of 1,2-bis-(3,5-di-tert-butylphenylene) (1-(N-(2-methylcyclohexyl)imino)methyl)(2-oxoyl) zirconium dimethyl were continuously supplied each at 44 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and 1-butene were continuously supplied into the polymerization reactor at 52 NL/h and 0.29 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/1-butene copolymer. The polymerization solution was poured into a large amount of methanol and thereby the ethylene/1-butene copolymer was precipitated. The copolymer was dried under reduced pressure at 130° C. for 24 hours. The properties of the copolymer are set forth in Table 2.

Comparative Example 2

A thoroughly nitrogen-purged 1 L continuous pressure polymerization reactor equipped with a stirring blade was charged with 1 L of dehydrated and purified n-hexane. By continuously feeding n-hexane at 0.53 L/h, the total pressure was increased to 3.6 MPa. A 0.0003 mmol/ml hexane solution of methylaluminoxane (MMAO-3A manufactured by Tosoh Finechem Corporation) was continuously supplied at 186 ml/h, and a 0.0009 mmol/ml hexane solution of diethylzinc (manufactured by KANTO CHEMICAL CO., INC.) was continuously supplied at 625 ml/h. Further, a 0.00038 mmol/ml solution of triphenylcarbenium(tetrakispentafluorophenyl) borate (manufactured by ASAHI GLASS CO., LTD.) as a cocatalyst was continuously supplied at 81 ml/h. Furthermore, a 0.00026 mmol/ml hexane solution of [N-(2,6-di(1-methylethyl)phenylamido)(2-methylphenyl) (1,2-phenylene-(6-pyridine-2-diyl)methane)]hafnium dimethyl and a 0.00019 mmol/ml solution of 1,2-bis-(3,5-di-tert-butylphenylene) (1-(N-(2-methylcyclohexyl)imino)methyl)(2-oxoyl) zirconium dimethyl were continuously supplied each at 44 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and 1-butene were continuously supplied into the polymerization reactor at 53 NL/h and 0.29 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/1-butene copolymer. The polymerization solution was poured into a large amount of methanol and thereby the ethylene/1-butene copolymer was precipitated. The copolymer was dried under reduced pressure at 130° C. for 24 hours. The properties of the copolymer are set forth in Table 2.

Comparative Example 3

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.0016 mmol/ml hexane solution of diethylzinc (manufactured by KANTO CHEMICAL CO., INC.) was continuously supplied at 750 ml/h. Further, a 0.06 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl)zirconium dichloride and a 0.00006 mmol/ml solution of ethylene(cyclopentadienyl) (fluorenyl)zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 26 NL/h and 0.24 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The properties of the copolymer are set forth in Table 2.

Comparative Example 4

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.0016 mmol/ml hexane solution of diethylzinc (manufactured by KANTO CHEMICAL CO., INC.) was continuously supplied at 750 ml/h. Further, a 0.13 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl) zirconium dichloride and a 0.0002 mmol/ml solution of ethylene(cyclopentadienyl) (fluorenyl)zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 26 NL/h and 0.24 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The properties of the copolymer are set forth in Table 2.

Comparative Example 5

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.0016 mmol/ml hexane solution of diethylzinc (manufactured by KANTO CHEMICAL CO., INC.) was continuously supplied at 750 ml/h. Further, a 0.06 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl) zirconium dichloride and a 0.00006 mmol/ml solution of ethylene(cyclopentadienyl) (fluorenyl)zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 40 NL/h and 0.15 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The properties of the copolymer are set forth in Table 2.

Comparative Example 6

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.0016 mmol/ml hexane solution of diethylzinc (manufactured by KANTO CHEMICAL CO., INC.) was continuously supplied at 750 ml/h. Further, a 0.09 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl)zirconium dichloride and a 0.00012 mmol/ml solution of ethylene(cyclopentadienyl) (fluorenyl)zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 36 NL/h and 0.24 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The properties of the copolymer are set forth in Table 3.

TABLE 2

|  |  | Comparative Example 1 | Comparative Example 2 | Comparative Example 3 | Comparative Example 4 | Comparative Example. 5 |
|---|---|---|---|---|---|---|
| Ethylene content | mol % | 82.3 | 82.2 | 53.7 | 59.6 | 57.7 |
| Mw × 10$^4$ | g/mol | 9.3 | 11.3 | 11.9 | 11.8 | 11.2 |
| Mw/Mn |  |  |  | 1.9 | 1.9 | 2.1 |
| Density | g/cm$^3$ | 0.866 | 0.844 | 0.854 | 0.856 | 0.868 |
| Tm | ° C. | 115.9 | 117.9 | −10.9 | −11.1 | 80.7 |
| 1073 × Density − 893 |  |  | 36.2 | 12.6 | 23.3 | 25.5 | 38.4 |
| ΔH | J/g | 40 | 44 | 9 | 20 | 23 |
| ΔT$_{half}$ | ° C. |  |  |  |  |  |
| −0.71 × Tm + 101.4 |  |  |  |  |  |  |
| Tc | ° C. | 89 | 99 | 7.2 | 6.9 | 61.9 |
| T$_{crystaf}$ | ° C. | 30 | 30 | *1 | *1 | 24 |
| Tc − T$_{crystaf}$ | ° C. | 59 | 69 | *1 | *1 | 37.9 |
| 0.028 × ΔH + 25.3 |  | 26.4 | 26.5 | 25.6 | 25.9 | 25.9 |

*1: immeasurable polymerization reactor at 40 NL/h and 0.15 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The properties of the copolymer are set forth in Table 3.

Comparative Example 7

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.0016 mmol/ml hexane solution of diethylzinc (manufactured by KANTO CHEMICAL CO., INC.) was continuously supplied at 750 ml/h. Further, a 0.06 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl) zirconium dichloride and a 0.00008 mmol/ml solution of ethylene(cyclopentadienyl) (fluorenyl)zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the

TABLE 3

|  |  | Comparative Example 6 | Comparative Example 7 |
|---|---|---|---|
| Ethylene content | mol % | 72.6 | 74.8 |
| Mw × 10$^4$ | g/mol | 11.1 | 10.9 |
| Mw/Mn |  | 2.0 | 1.9 |
| Density | g/cm$^3$ | 0.889 | 0.866 |
| Tm | ° C. | 79.9 | 41.8 |
| 1073 × Density − 893 |  | 60.9 | 36.2 |
| ΔH | J/g | 53 | 66 |
| ΔT$_{half}$ | ° C. |  |  |
| −0.71 × Tm + 101.4 |  |  |  |
| Tc | ° C. | 60.2 | 29.4 |
| T$_{crystaf}$ | ° C. | 23 | 0.9 |
| Tc − T$_{crystaf}$ | ° C. | 37.2 | 28.5 |
| 0.028 × ΔH + 25.3 |  | 26.8 | 27.1 |

Example 6

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.0016 mmol/ml hexane solution of diethylzinc (manufactured by KANTO CHEMICAL CO., INC.) was continuously supplied at 750 ml/h. Further, a 0.09 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl)zirconium dichloride and a 0.00012 mmol/ml solution of ethylene(cyclopentadienyl) (fluorenyl)zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 36 NL/h and 0.24 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The copolymer had an ethylene content of 61.5 mol %, a melting point (Tm) of 40.5° C., a heat of fusion of 24.0 J/g, each measured by DSC, and Mw/Mn of 2.0. The properties of the copolymer are set forth in Table 4.

Example 7

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.0016 mmol/ml hexane solution of diethylzinc (manufactured by KANTO CHEMICAL CO., INC.) was continuously supplied at 750 ml/h. Further, a 0.09 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl)zirconium dichloride and a 0.00012 mmol/ml solution of ethylene(cyclopentadienyl) (fluorenyl)zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 38 NL/h and 0.24 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The copolymer had an ethylene content of 65.9 mol %, a melting point (Tm) of 48.1° C., a $\Delta T_{half}$ of 65.1° C., a heat of fusion of 29.1 J/g, each measured by DSC, and $-0.71 \times Tm+101.4=60.1$. The properties of the copolymer are set forth in Table 4.

Example 8

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h, and a 0.0016 mmol/ml hexane solution of diethylzinc (manufactured by KANTO CHEMICAL CO., INC.) was continuously supplied at 750 ml/h. Further, a 0.09 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl)zirconium dichloride and a 0.00006 mmol/ml solution of ethylene(cyclopentadienyl) (fluorenyl)zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 36 NL/h and 0.24 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The copolymer had an ethylene content of 67.9 mol %, a crystallization temperature (Tc) of 28.1° C., a heat of fusion of 31.0 J/g, each measured by DSC, a $T_{crystaf}$ by the CRYSTAF method of $-3.6$° C., $Tc-T_{crystaf}=31.7$° C., and $0.028 \times \Delta H+25.3=26.2$. The properties of the copolymer are set forth in Table 5.

Comparative Example 8

A thoroughly nitrogen-purged 1000 ml glass autoclave was charged with 800 ml of dry toluene, and propylene was passed there through at 100 L/h for 15 minutes. The temperature of the system was maintained at 25° C., and 15.0 mmol in terms of aluminum of methylaluminoxane was added. Further, 0.15 mmol of [bis[N-(3-t-butylsalicylidene)-2,3,4,5,6-pentafluoroanilinato]titanium (IV) dichloride] was added, and the gas supply was switched to an ethylene/propylene (6.5/93.5 L/h) mixture gas, followed by stirring for 60 minutes. Then, the supply of ethylene was stopped, and a propylene/nitrogen (60/40 L/h) mixture gas was supplied instead, followed by stirring for 10 minutes. Subsequently, the gas supply was switched to an ethylene/propylene (85/15 L/h) mixture gas, followed by stirring for 6 minutes. The reaction was then terminated by adding 20 ml of methanol and 5 ml of 1.0 N hydrochloric acid. The system was continuously stirred for 30 minutes under a stream of nitrogen. The polymerization solution was deashed with distilled water and was poured into 1.5 L of methanol, thereby precipitating a polymer. The polymer was collected and was dried at 130° C. under reduced pressure for 10 hours, and 9.37 g of an ethylene/propylene copolymer was obtained. The copolymer had an ethylene content of 63.7 mol %, a melting point of 42.3° C., a heat of fusion of 20.8 J/g, each measured by DSC, and Mw/Mn of 1.3. The properties of the copolymer are set forth in Table 4.

Comparative Example 9

A thoroughly nitrogen-purged 1000 ml glass autoclave was charged with 800 ml of dry toluene, and propylene was passed there through at 100 L/h for 15 minutes. The temperature of the system was maintained at 50° C., and 15.0 mmol in terms of aluminum of methylaluminoxane was added. Further, 0.15 mmol of [bis[N-(3-t-butylsalicylidene)-2,3,4,5,6-pentafluoroanilinato]titanium (IV) dichloride] was added, and the gas supply was switched to an ethylene/propylene (6.5/93.5 L/h) mixture gas, followed by stirring for 60 minutes. Then the supply of ethylene was stopped, and a propylene/nitrogen (60/40 L/h) mixture gas was supplied instead, followed by stirring for 10 minutes. Subsequently, the gas supply was switched to an ethylene/propylene (85/15 L/h) mixture gas, followed by stirring for 6 minutes. The reaction was then terminated by adding 20 ml of methanol and 5 ml of 1.0 N hydrochloric acid. The system was continuously stirred for 30 minutes under a stream of nitrogen. The polymerization solution was deashed with distilled water and was poured into 1.5 L of methanol, thereby precipitating a polymer. The polymer was collected and was dried at 130° C. under reduced pressure for 10 hours, and 7.19 g of an ethylene/propylene copolymer was obtained. The copolymer had an ethylene content of 62.5 mol %, a melting point of 40.9° C., a heat of fusion of 21.2 J/g, each measured by DSC, and Mw/Mn of 1.4. The properties of the copolymer are set forth in Table 4.

Comparative Example 10

Polymerization was carried out in accordance with a method using a tubular reactor as described in JP-A-S60-35009. The resulted polymer solution was poured into a large amount of methanol, and thereby an ethylene/propylene copolymer was precipitated. The copolymer was dried under reduced pressure at 130° C. for 24 hours. The copolymer had an ethylene content of 64.9 mol %, a melting point (Tm) of 49.8° C., a $\Delta T_{half}$ of 109.1° C., a heat of fusion of 27.1 J/g, each measured by DSC, and $-0.71 \times Tm + 101.4 = 66.0$. The properties of the copolymer are set forth in Table 4.

Comparative Example 11

A thoroughly nitrogen-purged 1 L continuous pressure polymerization reactor equipped with a stirring blade was charged with 1 L of dehydrated and purified n-hexane. By continuously feeding n-hexane at 1.1 L/h, the total pressure was increased to 3.5 MPa. A 0.004 mmol/ml hexane solution of triisobutylaluminum (TIBA, manufactured by Tosoh Finechem Corporation) was continuously supplied at 750 ml/h. Further, a 0.09 mmol/ml solution of methylaluminoxane (TMAO-341 manufactured by Tosoh Finechem Corporation) as a cocatalyst was continuously supplied at 40 ml/h. Furthermore, a 0.00006 mmol/ml hexane solution of diphenylmethylene(3-tert-butyl-5-methylcyclopentadienyl) (2,7-di-tert-butylfluorenyl) zirconium dichloride and a 0.00012 mmol/ml solution of ethylene(cyclopentadienyl) (fluorenyl) zirconium dichloride were continuously supplied each at 40 ml/h, whereby there was no gas phase in the reactor. At the same time, the polymerization liquid was continuously discharged from an upper portion of the polymerization reactor while the amount of the polymerization liquid in the reactor was kept at 1 L. Subsequently, ethylene and propylene were continuously supplied into the polymerization reactor at 36 NL/h and 0.24 L/h, respectively. The copolymerization was performed while maintaining the temperature at 80° C. by circulating a refrigerant and steam in a jacket attached outside the polymerization reactor.

The copolymerization under the above conditions resulted in a polymerization solution containing an ethylene/propylene copolymer. The polymerization solution was poured into a large amount of methanol and thereby the ethylene/propylene copolymer was precipitated. The copolymer was dried under reduced pressure at 130° C. for 24 hours. The copolymer had an ethylene content of 68.8 mol %, a crystallization temperature (Tc) of 27.8° C., a heat of fusion of 33.0 J/g, each measured by DSC, a $T_{crystaf}$ by the CRYSTAF method of 2.1° C., Tc$-T_{crystaf}$=25.7° C., and 0.028×$\Delta$H+25.3=26.2. The properties of the copolymer are set forth in Table 5.

TABLE 4

|  |  | Example 6 | Comparative Example 8 | Comparative Example 9 | Example 7 | Comparative Example 10 |
|---|---|---|---|---|---|---|
| Ethylene content | mol % | 61.5 | 63.7 | 62.5 | 65.9 | 64.9 |
| Mw × 10⁴ | g/mol |  |  |  |  |  |
| Mw/Mn |  | 2.0 | 1.3 | 1.4 |  |  |
| Density | g/cm³ |  |  |  |  |  |
| Tm | ° C. | 40.5 | 42.3 | 40.9 | 48.1 | 49.8 |
| 1073 × Density − 893 |  |  |  |  |  |  |
| $\Delta$H | J/g | 24 | 21 | 21 | 29 | 27 |
| $\Delta T_{half}$ | ° C. |  |  |  | 60.1 | 109.1 |
| −0.71 × Tm + 101.4 |  |  |  |  | 67.2 | 66.0 |
| Tc | ° C. |  |  |  |  |  |
| $T_{crystaf}$ | ° C. |  |  |  |  |  |
| Tc − $T_{crystaf}$ | ° C. |  |  |  |  |  |
| 0.028 × $\Delta$H + 25.3 |  |  |  |  |  |  |

TABLE 5

|  |  | Example 8 | Comparative Example 11 |
|---|---|---|---|
| Ethylene content | mol % | 67.9 | 68.8 |
| Mw × 10⁴ | g/mol |  |  |
| Mw/Mn |  |  |  |
| Density | g/cm³ |  |  |
| Tm | ° C. |  |  |
| 1073 × Density − 893 |  |  |  |
| $\Delta$H | J/g | 31 | 33 |
| $\Delta T_{half}$ | ° C. |  |  |
| −0.71 × Tm + 101.4 |  |  |  |
| Tc | ° C. | 28.1 | 27.8 |
| $T_{crystaf}$ | ° C. | −3.6 | 2.1 |
| Tc − $T_{crystaf}$ | ° C. | 31.7 | 25.7 |
| 0.028 × $\Delta$H + 25.3 |  | 26.2 | 26.2 |

In general, polymer properties vary depending on polymerization processes and polymerization apparatuses.

Comparison between Example 6 and Comparative Examples 8 and 9 shows that polymers obtained by living polymerization (A process disclosed in Patent Document 3) do not satisfy the requirement (3) according to the present invention. From the comparison between Example 7 and Comparative Example 10, the polymerization using a tubular reactor as described in JP-A-S60-35009 (Patent Document 2) does not give polymers satisfying the requirements (4) and (5) of the present invention. Comparing Example 8 and Comparative Example 11 shows that polymers do not satisfy the requirement (8) of the present invention when the chain transfer catalysts are not used (A process disclosed in Patent Document 1).

Example 12

A lubricating oil composition was prepared and evaluated in the same manner as in Example 9, except that the copolymer from Example 4 was used as the lubricating oil viscosity modifier and the material amounts were changed as described in Table 6. The results are shown in Table 6.

Example 13

A lubricating oil composition was prepared and evaluated in the same manner as in Example 9, except that the copolymer from Example 5 was used as the lubricating oil viscosity modifier and the material amounts were changed as described in Table 6. The results are shown in Table 6.

TABLE 6

|  |  | Example 9 | Example 10 | Example 11 | Example 12 | Example 13 |
|---|---|---|---|---|---|---|
| [Materials] |  |  |  |  |  |  |
| Lubricating oil basestock | wt % | 87.2 | 87.1 | 87.1 | 87.1 | 87.1 |
| Detergent dispersant | wt % | 11.0 | 11.0 | 11.0 | 11.0 | 11.0 |
| Pour-point depressant | wt % | 0.5 | 0.5 | 0.5 | 0.5 | 0.5 |
| Copolymer |  | Example 1 | Example 2 | Example 3 | Example 4 | Example 5 |
|  | wt % | 1.3 | 1.4 | 1.4 | 1.4 | 1.4 |
| [Lubricating oil physical properties] |  |  |  |  |  |  |
| Kinematic viscosity at 100° C. | mm$^2$/s | 15.03 | 14.98 | 14.89 | 15.04 | 14.91 |
| MRV | mPa·s | 33000 | 31000 | 28000 | 25000 | 33000 |
| CCS | mPa·s | 7320 | 7390 | 7250 | 7110 | 7360 |
| Low-temperature flowability |  | AA | AA | AA | AA | AA |

Example 9

A lubricating oil composition was prepared from 86.9 wt % of a lubricating oil basestock that was mineral oil 120 Neutral (trade name, manufactured by ESSO Co., Ltd.) having a kinematic viscosity at 100° C. of 4.60 mm$^2$/s, 1.6 wt % of the copolymer from Example 1 as a lubricating oil viscosity modifier, 0.5 wt % of pour-point depressant ACLUBE 146 (manufactured by Sanyo Chemical Industries, Ltd.) and 11.0 wt % of detergent dispersant LZ 20003C (manufactured by The Lubrizol Corporation). Performances of the lubricating oil composition were evaluated. The results are shown in Table 6.

Example 10

A lubricating oil composition was prepared and evaluated in the same manner as in Example 9, except that the copolymer from Example 2 was used as the lubricating oil viscosity modifier and the material amounts were changed as described in Table 6. The results are shown in Table 6.

Example 11

A lubricating oil composition was prepared and evaluated in the same manner as in Example 9, except that the copolymer from Example 3 was used as the lubricating oil viscosity modifier and the material amounts were changed as described in Table 6. The results are shown in Table 6.

Comparative Examples 12 to 18

Lubricating oil compositions were prepared and evaluated in the same manner as in Example 9, except that the copolymers from Comparative Examples 1 to 7 were used as the lubricating oil viscosity modifier and the material amounts were changed as described in Table 7 or 8. The results are shown in Tables 7 and 8.

TABLE 7

|  |  | Comparative Example 12 | Comparative Example 13 |
|---|---|---|---|
| [Materials] |  |  |  |
| Lubricating oil basestock | wt % | 86.9 | 87.1 |
| Detergent dispersant | wt % | 11.0 | 11.0 |
| Pour-point depressant | wt % | 0.5 | 0.5 |
| Copolymer |  | Comparative Example 1 | Comparative Example 2 |
|  | wt % | 1.6 | 1.4 |
| [Lubricating oil physical properties] |  |  |  |
| Kinematic viscosity at 100° C. | mm$^2$/s | 14.95 | 15.02 |
| MRV | mPa·s | 1) | 1) |
| CCS | mPa·s | 1) | 1) |
| Low-temperature flowability |  | CC | CC |

1): The oil became gelled at room temperature and the viscosity measurement was impossible.

TABLE 8

|  |  | Comparative Example 14 | Comparative Example 15 | Comparative Example 16 | Comparative Example 17 | Comparative Example 18 |
|---|---|---|---|---|---|---|
| [Materials] |  |  |  |  |  |  |
| Lubricating oil basestock | wt % | 87.1 | 87.1 | 87.1 | 87.1 | 87.2 |
| Detergent dispersant | wt % | 11.0 | 11.0 | 11.0 | 11.0 | 11.0 |
| Pour-point depressant | wt % | 0.5 | 0.5 | 0.5 | 0.5 | 0.5 |
| Copolymer |  | Comparative Example 3 | Comparative Example 4 | Comparative Example 5 | Comparative Example 6 | Comparative Example 7 |
|  | wt % | 1.4 | 1.4 | 1.4 | 1.4 | 1.4 |
| [Lubricating oil physical properties] |  |  |  |  |  |  |
| Kinematic viscosity at 100° C. | mm$^2$/s | 14.86 | 14.95 | 15.01 | 15.05 | 14.92 |
| MRV | mPa·s | 80200 | Immeasurable | 70600 | Immeasurable | 63000 |
| CCS | mPa·s | 7540 | 7460 | 7330 | 6970 | 7400 |
| Low-temperature flowability |  | AA | AA | CC | CC | AA |

The invention claimed is:

1. A process for producing a copolymer, which process comprises polymerizing ethylene and a C3-20 α-olefin in the presence of two or more polymerization catalysts and a chain transfer catalyst wherein the polymerization catalysts are capable of providing polymers with different properties under substantially identical polymerization conditions, wherein said copolymer comprises structural units derived from ethylene and structural units derived from a C3-20 α-olefin and satisfies the following requirement;

(1) the melting point (Tm) according to DSC is in the range of 0 to 60° C.

2. A process for producing a copolymer, which process comprises polymerizing ethylene and a C3-20 α-olefin in the presence of two or more polymerization catalysts and a chain transfer catalyst wherein the polymerization catalysts are capable of providing polymers with different properties under substantially identical polymerization conditions, wherein said copolymer comprises structural units derived from ethylene and structural units derived from a C3-20 α-olefin and satisfies the following requirements;

(1) the melting point (Tm) according to DSC is in the range of 0 to 60° C.; and (7) the crystallization temperature (Tc) according to DSC is not more than 70° C.

3. A process for producing a copolymer, which process comprises polymerizing ethylene and a C3-20 α-olefin in the presence of two or more polymerization catalysts and a chain transfer catalyst wherein the polymerization catalysts are capable of providing polymers with different properties under substantially identical polymerization conditions, wherein said copolymer comprises structural units derived from ethylene and structural units derived from a C3-20 α-olefin and satisfies the following requirement;

(1) the melting point (Tm) according to DSC is in the range of 0 to 60° C.;

(2) the melting point (Tm) and the density D (g/cm$^3$) satisfy the equation {1} below:

$$Tm \geq 1073 \times D - 893 \qquad \{1\}; \text{ and}$$

(7) the crystallization temperature (Tc) according to DSC is not more than 70° C.

4. A process for producing a copolymer, which process comprises polymerizing ethylene and a C3-20 α-olefin in the presence of two or more polymerization catalysts and a chain transfer catalyst wherein the polymerization catalysts are capable of providing polymers with different properties under substantially identical polymerization conditions, wherein said copolymer comprises structural units derived from ethylene and structural units derived from a C3-20 α-olefin and wherein the copolymer satisfies the following requirements (1) to (8):

(1) the melting point (Tm) according to DSC is in the range of 0 to 60° C.;

(2) the melting point (Tm) and the density D (g/cm$^3$) satisfy the equation {1} below:

$$Tm \geq 1073D - 893 \qquad \{1\}$$

(3) Mw/Mn according to GPC is in the range of 1.6 to 5.0;

(4) the half-value width ($\Delta T_{half}$) of a melting peak measured by DSC is not more than 90° C.;

(5) the half-value width ($\Delta T_{half}$) and the melting point (Tm) satisfy the equation {2} below:

$$\Delta T_{half} \leq -0.71 \times Tm + 101.4 \qquad \{2\}$$

(6) the heat of fusion (ΔH) as measured by DSC is not more than 60 J/g;

(7) the crystallization temperature (Tc) according to DSC is not more than 70° C.; and (8) the heat of fusion (ΔH), the crystallization temperature (Tc) measured by DSC and the crystallization temperature measured by a CRYSTAF method ($T_{crystaf}$) satisfy the equation {3} below:

$$Tc - T_{crystaf} \geq 0.028 \times \Delta H + 25.3 \qquad \{3\}.$$

* * * * *